United States Patent
Lee et al.

(10) Patent No.: US 10,524,004 B2
(45) Date of Patent: Dec. 31, 2019

(54) CONTENT RECOMMENDATION METHOD AND DEVICE

(71) Applicant: Samsung Electronics Co., Ltd., Suwon-si, Gyeonggi-do (KR)

(72) Inventors: Chang Kyo Lee, Suwon-si (KR); Byung In Yoo, Seoul (KR); Seung Ju Han, Suwon-si (KR); Jae Joon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/111,943

(22) PCT Filed: May 2, 2014

(86) PCT No.: PCT/KR2014/003915
§ 371 (c)(1),
(2) Date: Jul. 15, 2016

(87) PCT Pub. No.: WO2015/119335
PCT Pub. Date: Aug. 13, 2015

(65) Prior Publication Data
US 2016/0337696 A1 Nov. 17, 2016

(30) Foreign Application Priority Data
Feb. 7, 2014 (KR) ........................ 10-2014-0014184

(51) Int. Cl.
*H04N 21/442* (2011.01)
*H04N 21/25* (2011.01)
(Continued)

(52) U.S. Cl.
CPC ......... *H04N 21/44218* (2013.01); *G06F 3/01* (2013.01); *G06F 3/14* (2013.01);
(Continued)

(58) Field of Classification Search
None
See application file for complete search history.

(56) References Cited

U.S. PATENT DOCUMENTS

| | | | |
|---|---|---|---|
| 7,496,277 B2 | 2/2009 | Ackley et al. | |
| 7,564,994 B1 * | 7/2009 | Steinberg | G06F 16/583 |
| | | | 382/118 |

(Continued)

FOREIGN PATENT DOCUMENTS

| JP | 2006-100881 A | 4/2006 |
|---|---|---|
| JP | 2006-324809 A | 11/2006 |

(Continued)

OTHER PUBLICATIONS

International Search Report PCT/ISA/210 for International Application No. PCT/KR2014/003915 dated Nov. 7, 2014 and English language translation thereof.

(Continued)

*Primary Examiner* — Justin E Shepard
(74) *Attorney, Agent, or Firm* — Harness, Dickey & Pierce, P.L.C.

(57) ABSTRACT

A content recommendation method and device for recommending content to a user are disclosed. According to one embodiment, the content recommendation device extracts the features of a user from image data, audio data and the like, and can determine a recognition rate indicating the degree that is recognized as a user model predetermined according to the features of the user. The content recommendation device can determine the recommended content to be provided to the user on the basis of the determined recognition rate.

16 Claims, 12 Drawing Sheets

300

| User feature | Recognition rate <TH1 | TH1<Recognition rate<TH2 | TH2≤ Recognition rate |
|---|---|---|---|
| Face | D | A, B, C | - |
| Hairstyle | A | B, C, D | - |
| Gait | | A, B, C, D | - |
| Voice | B | A, C, D | - |

(51) Int. Cl.
*H04N 21/258* (2011.01)
*G06F 3/14* (2006.01)
*G06F 3/01* (2006.01)
*H04N 21/475* (2011.01)
*G06K 9/00* (2006.01)
*H04N 21/4415* (2011.01)
*G06F 16/90* (2019.01)
*G06Q 30/02* (2012.01)

(52) U.S. Cl.
CPC ......... *G06F 16/90* (2019.01); *G06K 9/00228* (2013.01); *G06Q 30/02* (2013.01); *H04N 21/25* (2013.01); *H04N 21/251* (2013.01); *H04N 21/258* (2013.01); *H04N 21/25875* (2013.01); *H04N 21/25891* (2013.01); *H04N 21/4415* (2013.01); *H04N 21/475* (2013.01); *G09G 2354/00* (2013.01)

(56) References Cited

U.S. PATENT DOCUMENTS

| | | | |
|---|---|---|---|
| 8,249,414 B2 | 8/2012 | Ackley et al. | |
| 8,539,357 B2 | 9/2013 | Hildreth | |
| 2003/0039380 A1* | 2/2003 | Sukegawa | G06K 9/6255 382/118 |
| 2005/0019015 A1 | 1/2005 | Ackley et al. | |
| 2009/0109339 A1 | 4/2009 | Ackley et al. | |
| 2009/0138805 A1 | 5/2009 | Hildreth | |
| 2010/0141786 A1* | 6/2010 | Bigioi | G06K 9/00288 348/222.1 |
| 2010/0199310 A1* | 8/2010 | Newell | H04N 7/17318 725/46 |
| 2012/0161954 A1* | 6/2012 | Liao | A61B 5/1176 340/439 |
| 2012/0257797 A1* | 10/2012 | Leyvand | G06K 9/00221 382/118 |
| 2013/0038794 A1 | 2/2013 | Ackley et al. | |
| 2013/0174035 A1* | 7/2013 | Grab | G06F 3/04842 715/716 |
| 2013/0247175 A1* | 9/2013 | Nechyba | G06F 21/32 726/19 |
| 2013/0312018 A1 | 11/2013 | Elliott et al. | |
| 2013/0329966 A1 | 12/2013 | Hildreth | |
| 2013/0347039 A1 | 12/2013 | Klappert et al. | |
| 2014/0152869 A1* | 6/2014 | Solotko | G06Q 10/10 348/231.3 |

FOREIGN PATENT DOCUMENTS

| | | |
|---|---|---|
| JP | 2012-22258 A | 11/2012 |
| KR | 2009-0046361 A | 5/2009 |
| KR | 2009-0119670 A | 11/2009 |
| KR | 2011-0023496 A | 3/2011 |
| KR | 2012-0042314 A | 5/2012 |
| KR | 2012-0050615 A | 5/2012 |
| KR | 2013-0072038 A | 7/2013 |

OTHER PUBLICATIONS

Written Opinion of the International Searching Authority PCT/ISA/237 for International Application No. PCT/KR2014/003915 dated Nov. 7, 2014.

* cited by examiner

| User feature | Recognition rate ≤TH1 | TH1<Recognition rate<TH2 | TH2≤ Recognition rate |
|---|---|---|---|
| Face | D | A, B, C | - |
| Hairstyle | A | B, C, D | - |
| Gait |  | A, B, C, D | - |
| Voice | B | A, C, D | - |

FIG. 4

| User model | Channel | Preference | Preference channel | Common preference channel |
|---|---|---|---|---|
| A | Ch1 | 0.9 | Ch1, Ch2, Ch3 | Ch2 |
| A | Ch2 | 0.3 | Ch1, Ch2, Ch3 | Ch2 |
| A | Ch3 | 0.6 | Ch1, Ch2, Ch3 | Ch2 |
| B | Ch1 | -0.5 | Ch2, Ch3 | Ch2 |
| B | Ch2 | 0.7 | Ch2, Ch3 | Ch2 |
| B | Ch3 | 0.5 | Ch2, Ch3 | Ch2 |
| C | Ch1 | 0.2 | Ch1, Ch2 | Ch2 |
| C | Ch2 | 0.2 | Ch1, Ch2 | Ch2 |
| C | Ch3 | -1.0 | Ch1, Ch2 | Ch2 |

CONTENT RECOMMENDATION METHOD AND DEVICE

CROSS-REFERENCE TO RELATED APPLICATIONS

This application is the U.S. National Phase application of PCT Application No. PCT/KR2014/003915 filed on May 2, 2014, which claims priority to Korean Application No. 10-2014-0014184 filed on Feb. 7, 2014, the contents of each of which are incorporated herein by reference.

TECHNICAL FIELD

Example embodiments relate to technology for recommending contents to a user.

BACKGROUND ART

In general, a content search and a content recommendation may be performed based on metadata of contents. A user may request the content recommendation by inputting content-related searching information including, for example, a name and a type of desired contents in a search engine provided in a content providing platform or on the Internet.

Recently, technology for automatically recognizing a user and providing contents that may be preferred by the recognized user has been launched. For example, the technology may be implemented by setting an identification (ID) for a face of a user, determining an ID corresponding to a current user based on faces of users acquired through a camera, and providing preference contents of the determined ID.

DISCLOSURE OF INVENTION

Technical Goals

According to example embodiments, there is provided a method of recommending contents, the method including extracting user features of a user from at least one of image data and audio data, determining, for each of the user features, a recognition rate indicating a degree to which the user is recognized as a predetermined user model, and determining recommendation contents to be provided to the user based on the recognition rate.

The determining of the recommendation contents may include determining a user model corresponding to the user based on a preset first threshold, a second threshold greater than the first threshold, and the recognition rate determined for each of the user features, and determining preference contents of the determined user model to be the recommendation contents to be provided to the user.

The determining of the recommendation contents may include determining user models, each having a recognition rate included in a range between a preset first threshold and a second threshold greater than the first threshold to be a user model group, and determining, when a user model having a recognition rate greater than the second threshold is absent and a user model group is identically determined for each of the user features, common preference contents of user models in the user model group to be the recommendation contents to be provided to the user.

According to example embodiments, there is also provided a method of recommending contents, the method including detecting a presence of a new user based on image data acquired by a camera, determining preference contents for the new user when the new user is present, and providing information on the determined preference contents.

According to example embodiments, there is also provided a method of recommending contents, the method including detecting an absence of a current user based on image data acquired by a camera, determining preference contents for remaining users excluding the current user when the absence of the current user is detected, and providing information on the determined preference contents.

According to example embodiments, there is also provided a device for recommending contents, the apparatus including a user feature extractor configured to extract user features of a user from at least one of image data and audio data, a recognition determiner configured to determine a recognition rate indicating a degree to which the user is recognized as a predetermined user model for each of the user feature, and a recommendation content determiner configured to determine recommendation contents to be provided to the user based on the recognition rate.

The device may further include a content display configured to display the recommendation contents.

BRIEF DESCRIPTION OF DRAWINGS

FIG. 3 is a diagram illustrating an example of generating a user model group according to an example embodiment.

FIG. 4 is a diagram illustrating an example of determining common preference contents of a user model group according to an example embodiment.

BEST MODE FOR CARRYING OUT THE INVENTION

Hereinafter, example embodiments will be described with reference to the accompanying drawings. The features described herein may be embodied in different forms, and are not to be construed as being limited to the examples described herein. A content recommendation method may be performed by a content recommendation apparatus.

Figure 1:
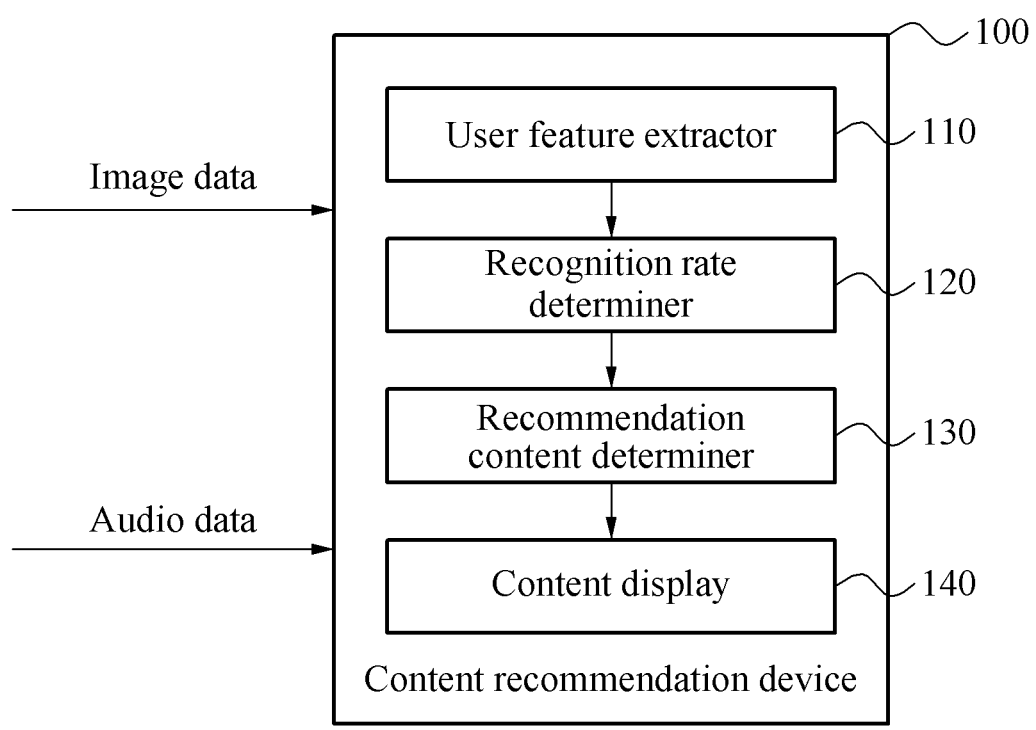
FIG. 1 is a block diagram illustrating a content recommendation device according to an example embodiment.

FIG. 1 is a block diagram illustrating a content recommendation device 100 according to an example embodiment.

The content recommendation device 100 may recognize a user based on image data or audio data and determine contents that may be preferred by the user. The content recommendation device 100 may automatically recognize the user and determine recommendation contents to be provided to the user irrespective of whether the user registers an identification (ID). The content recommendation device 100 may extract user features from at least one of image data generated by capturing the user or audio data including a voice of the user, determine a recognition rate for each of the user features, and determine the recommendation contents to be provided to the user based on the recognition rate and a preset threshold.

Referring to FIG. 1, the content recommendation device 100 may include a user feature extractor 110, a recognition rate determiner 120, a recommendation content determiner 130, and a content display 140.

The user feature extractor 110 may extract user features of a user from at least one of image data or audio data. The user feature extractor 110 may extract user features, for example, a face, a hairstyle, a height, a body type, a gait, a gender, a complexion, and clothing of the user from the image data generated by photographing the user. The user feature extractor 110 may also extract user features, for example, a voice and a sound of footsteps of the user from the audio data.

For example, when the user enters a photographing region of a camera, image data generated by photographing the user may be transmitted to the content recommendation device 100, the user feature extractor 110 may separate each user from the received image data. The user feature extractor 110 may extract a user feature for each user separated from the image data. When it is assumed that the image data includes a first user and a second user, the user feature extractor 110 may separate the first user and the second user from the image data and independently extract a user feature for each of the first user and the second user.

When the user feature extractor 110 uses both image data and audio data, the user feature extractor 110 may determine a user corresponding to a user feature included in the audio data among the users included in the image data through a synchronization between a time at which the user makes a motion in the image data and a time at which a sound is made in the audio data. For example, when a voice of a predetermined user is included in a predetermined time of the audio data, the user feature extractor 110 may identify a user talking at a point in time corresponding to the predetermined time of the audio data and determine the voice to be a user feature of the user identified in the image data.

The recognition rate determiner 120 may determine a recognition rate indicating a degree to which the user is recognized as a predetermined user model for each of the user features. For example, when a user model A and a user model B are present, and when the user feature extractor 110 extracts user features including a face and a complexion of a user from the image data, the recognition rate determiner 120 may calculate a degree to which the user is recognized as the user model A and a degree to which the user is recognized as the user model B in association with the face of the user. Also, in association with the complexion of the user, the recognition rate determiner 120 may calculate the degree to which the user is recognized as the user model A and the degree to which the user is recognized as the user model B.

Information on a plurality of predetermined user models may be stored in the content recommendation device 100 in advance. Based on the information, the content recommendation device 100 may determine recommendation contents for the user. Information on a user model may include, for example, contents preferred by each user model, a genre of the contents, and a preference of the contents. The information on the user model may be stored in a form of metadata in advance.

For example, when the content recommendation device 100 is used at home, user models corresponding to family members may be set. The user models may be generated through a setting of a user in an initial operation of the content recommendation device 100 or generated through an unsupervised learning not through the setting. When the user models are generated through the setting of the user, the content recommendation device 100 may use information on a prestored user model. When the user models are generated through the unsupervised learning, the content recommendation device 100 may generate a user model corresponding to a new user not through the setting in response to an addition of the new user and update information on the generated user model based on image data or audio data of the new user. Through this, the content recommendation device 100 may determine a recognition rate based on predetermined user models.

The recommendation content determiner 130 may determine the recommendation contents to be provided to the user based on the recognition rate determined for each of the user features. The recommendation content determiner 130 may determine the user model corresponding to the user based on a preset first threshold, a second threshold greater than the first threshold, and the recognition rate determined for each of the user features. The first threshold and the second threshold may be the same as each other irrespective of the user features or may differ from each other based on the user features.

The recommendation content determiner 130 may determine user models of which recognition rates determined for each of the user features are included in a range between the first threshold and the second threshold to be a user model group. The recommendation content determiner 130 may determine the recommendation contents to be provided to the user based on preference contents of the user models included in the user model group.

For example, when only a face is used as a user feature, when a user model having a recognition rate greater than or equal to the second threshold in association with the face does not exist, and when recognition rates of the user model A and the user model B are included in the range between the first threshold and the second threshold, the recommendation content determiner 130 may determine common preference contents of the user model A and the user model B to be the recommendation contents. When the common preference contents of the user model A and the user model B is absent, the recommendation content determiner 130 may display preference contents of the user model A and the user model B such that the user selects contents in person.

When a plurality of user features is used, when the user model having the recognition rate greater than or equal to the second threshold is absent, and when the same user model group is determined for each of the user features, the recommendation content determiner 130 may determine common preference contents of user models included in the user model group to be the recommendation contents. When the common preference contents of the user models included in the use model group is absent, the recommendation content determiner 130 may display preference contents of the user models included in the user model group.

When the user model having the recognition rate greater than or equal to the second threshold does not exist, and when the same user model group is determined for each of the user features, the recommendation content determiner 130 may output a selection request message for the user models included in the user model group. The recommendation content determiner 130 may output the selection request message, for example, in a form of text, on a popup window, or through a voice. The recommendation content determiner 130 may determine the user model corresponding to the user based on a selection response message responding to the selection request message, and determine preference contents of the determined user model to be the recommendation contents to be provided to the user. For example, the recommendation content determiner 130 may identify a user model selected by the user in the selection response message and determine preference contents of the identified user model to be the recommendation contents.

The recommendation content determiner 130 may identify the user model having the recognition rate greater than or equal to the second threshold for each of the user features. Also, the recommendation content determiner 130 may determine user models having recognition rates, each greater than the first threshold and less than the second threshold to be a user model group for each of the user features. The recommendation content determiner 130 may determine the user model corresponding to the user based on the user model having the recognition rate greater than or equal to the second threshold, the user model group, and a weight determined for each of the user features. For example, to determine the recommendation contents, the recommendation content determiner 130 may apply a relatively large weight to the user model having the recognition rate greater than or equal to the second threshold. Also, the recommendation content determiner 130 may apply a relatively small weight to a user model less than or equal to the first threshold or exclude the user model from subjects for consideration. The recommendation content determiner 130 may determine preference contents of the determined user model to be the recommendation contents to be provided to the user.

The recommendation content determiner 130 may determine a final recognition rate for each of the user models based on the recognition rate and the weight determined for each of the user features, and may determine a user model having a greatest recognition rate to be the user model corresponding to the user. The weight may be determined based on, for example, a distance between the user and a camera and a time. For example, when the weight is determined based on the distance between the user and the camera, the recommendation content determiner 130 may reduce a weight of a face and relatively increase weights of clothing and a body type of the user among various user features. When the weight is the time, the recommendation content determiner 130 may relatively increase a weight of an auditory feature such as a voice and a sound of footsteps of the user as a time of determining the user model is prolonged.

When all recognition rates determined for each of the user features are included in a range from zero to the first threshold, the recommendation content determiner 130 may terminate the determining of the recommendation contents and maintain contents being played currently.

The content display 140 may display the recommendation contents. The content display 140 may automatically display the recommendation contents or display the recommendation contents when a playback request for the recommendation contents is received from the user. When the content display 140 displays a plurality of items of contents on a screen, the content display 140 may display the recommendation contents based on information on a preference of the user model. When the user model corresponding to the user is determined, the content display 140 may display preference contents of the determined user model on the screen based on a preference for each item of preference contents. For example, the content display 140 may display preference contents corresponding to a great preference on a relatively large area and display preference contents corresponding to a less preference on a relatively small area.

Figure 2:
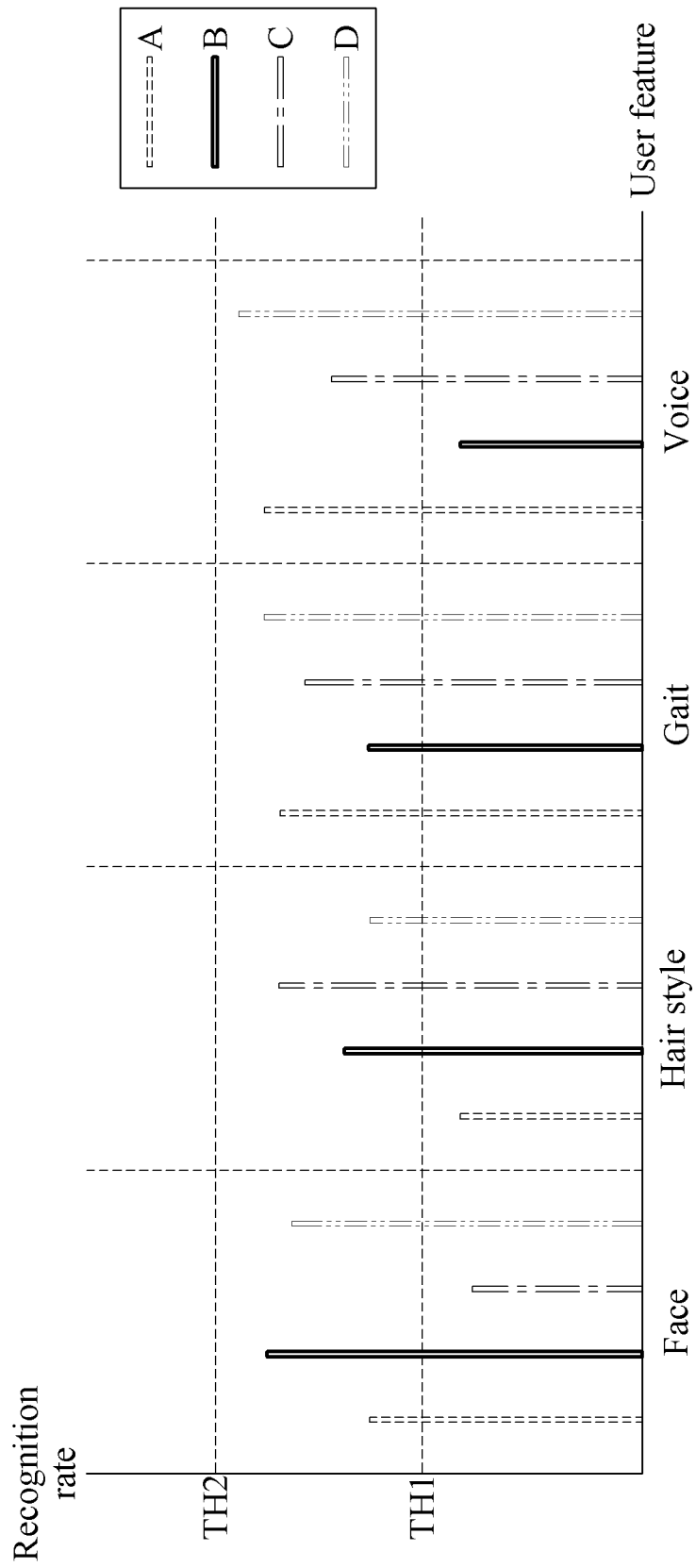
FIG. 2 is a diagram illustrating an example of a recognition rate determined for each user feature according to an example embodiment.

FIG. 2 is a diagram illustrating an example of a recognition rate determined for each user feature according to an example embodiment.

FIG. 2 illustrates an example of a recognition rate determined for each user feature. In a graph, a vertical axis represents a recognition rate, and TH1 and TH2 denote preset thresholds. A horizontal axis of the graph represents user features. Four user features including a face, a hairstyle, a gait, and a voice of a user are used in an example of FIG. 2. User models are indicated by A, B, C, and D. The recognition rate may indicate a degree to which the user is recognized as each of the user models in association with each of the user features. For example, in association with the face in the user features, a degree to which a target user is recognized as the user model B may be highest, and a degree to which the target user is recognized as the user model C may be lowest in FIG. 2. A content recommendation device may determine user models, each having a recognition rate is included in a range between TH1 and TH2 for each of the user features to be a user model group. For example, the content recommendation device may determine recommendation contents to be provided to the user based on user models having recognition rates greater than TH1 excluding a user model having a recognition rate less than or equal to TH1 for each of the user features.

FIG. 3 is a diagram illustrating an example of generating a user model group according to an example embodiment.

A table 300 of FIG. 3 show a user model group generated based on an example of FIG. 2. A content recommendation device may set user models corresponding to a range of, for example, TH1<Recognition rate<TH2 for each of user features to be in a user model group. In an example of FIG. 2, the user models A, B, and C may be included in the range of TH1<Recognition rate<TH2 in association with a face of the user features. Thus, as shown in the table 300, the user model A, B, and C may be determined to be the user model group. For example, the content recommendation device may set the user model group for each of the user features based on Equation 1.

$$\text{USER} = \arg[TH_1 < P_{i,j} < TH_2]$$ [Equation 1]

In Equation 1, USER denotes a user model group for each of the user feature, and $P_{i,j}$ denotes a recognition rate of a user model j in association with a user feature i. Equation 1 shows that the user model group set for each of the user features is a group of user models having recognition rates included in a range between a threshold $TH_1$ and a threshold $TH_2$ in association with a corresponding user feature.

When a plurality of user features is used, the content recommendation device may determine a final recognition rate for each of the user models based on Equation 2.

$$P = \alpha P_1 + \beta P_2 + \ldots$$ [Equation 2]

In Equation 2, P denotes a final recognition rate for a predetermined user model, and $P_1$ and $P_2$ each denote a recognition rate of the predetermined user model determined for each of the user features. α, β each denote a weight determined for each of the user features. The weight for each of the user features may be determined based on, for example, a distance between a camera and a user or a time.

The content recommendation device may determine the final recognition rate of each of the user models and determine preference contents of a user model having a highest recognition rate to be recommendation contents to be provided to a user.

FIG. 4 is a diagram illustrating an example of determining common preference contents of a user model group according to an example embodiment.

When one user feature is used, when a user model having a recognition rate greater than or equal to a second threshold is absent, and when a user model group including user models A, B, and C is determined, the content recommendation device may determine common preference contents among preference contents of the user models A, B, and C included in the user model group to be recommendation contents to be provided to a user. FIG. 4 shows preference channels of broadcast channels as an example of preference contents. Among channels Ch1, Ch2, and Ch3 corresponding to preference channels of the user model A, the channels Ch2 and Ch3 corresponding to preference channels of the user model B, and the channels Ch1 and Ch2 corresponding to preference channels of the user model C, the channel Ch2 that is a common preference channel may be determined to be the recommendation contents. When the common preference channel of the user models A, B, and C is absent, the content recommendation device may display the preference channels of the user models A, B, and C such that the user selects a desired channel. Information on a user model may include information on preference content and preference information for each item of preference contents.

Figure 5:
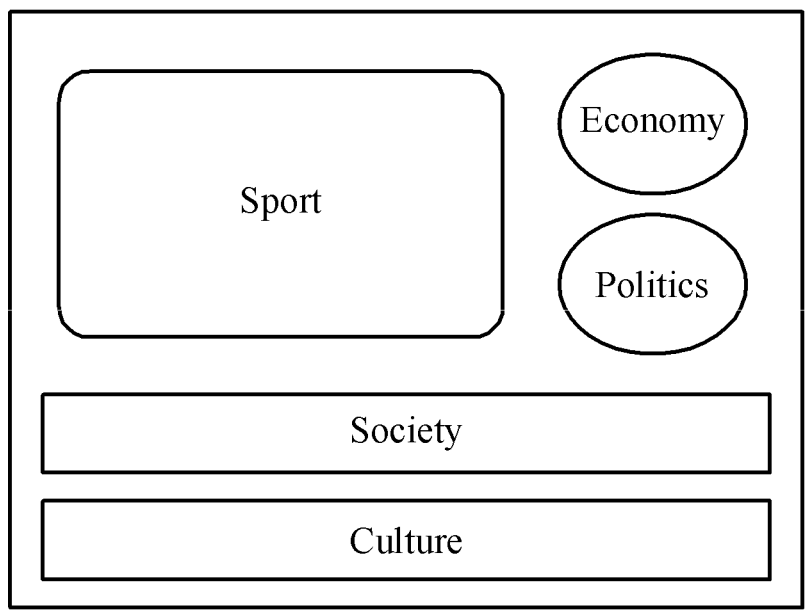
FIGS. 5 and 6 are diagrams illustrating examples of displaying recommendation contents according to an example embodiment.
Figure 6:
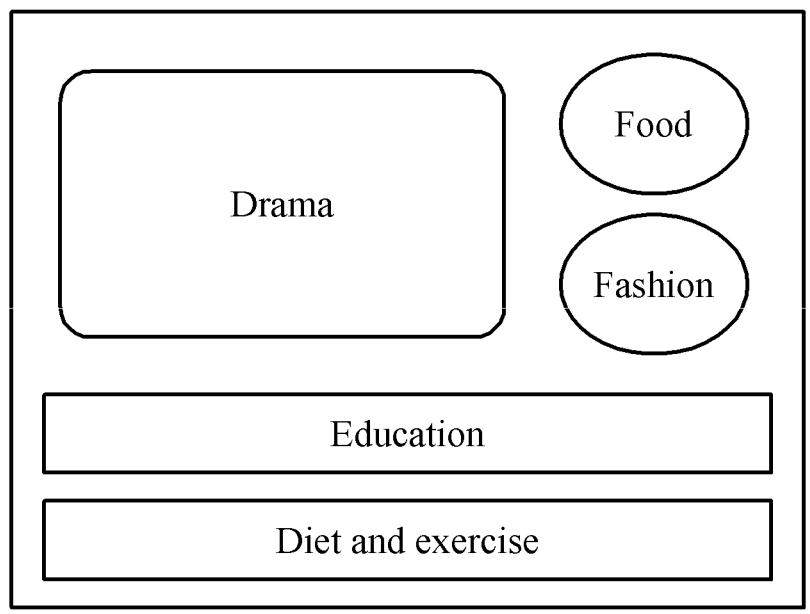

FIGS. 5 and 6 are diagrams illustrating examples of displaying recommendation contents according to an example embodiment.

FIGS. 5 and 6 illustrate an example of displaying a plurality of items of contents based on a preference for each item of the contents. In this example, a content recommendation device may display recommendation contents to be provided to a user on a web page.

When a user model corresponding to a user is determined, the content recommendation device may display preference contents of the determined user model based on a preference for each item of the preference contents. In an example of FIG. 5, when the user model corresponding to the user has a highest preference for sport, the content recommendation device may assign a largest portion of the web page to the sport. Also, the content recommendation device may arrange other contents about economy, politics, society, and culture or display the other contents by varying sizes of portions on the web page based on a preference for each items of the contents. In an example of FIG. 6, when the user model corresponding to the user has a highest preference for a drama, the content recommendation device may assign a largest portion of the web page to the drama. Also, the content recommendation device may arrange other contents about food, fashion, education, and diet and exercise or display the other contents by varying sizes of portions on the web page based on a preference for each item of the contents.

Figure 7:
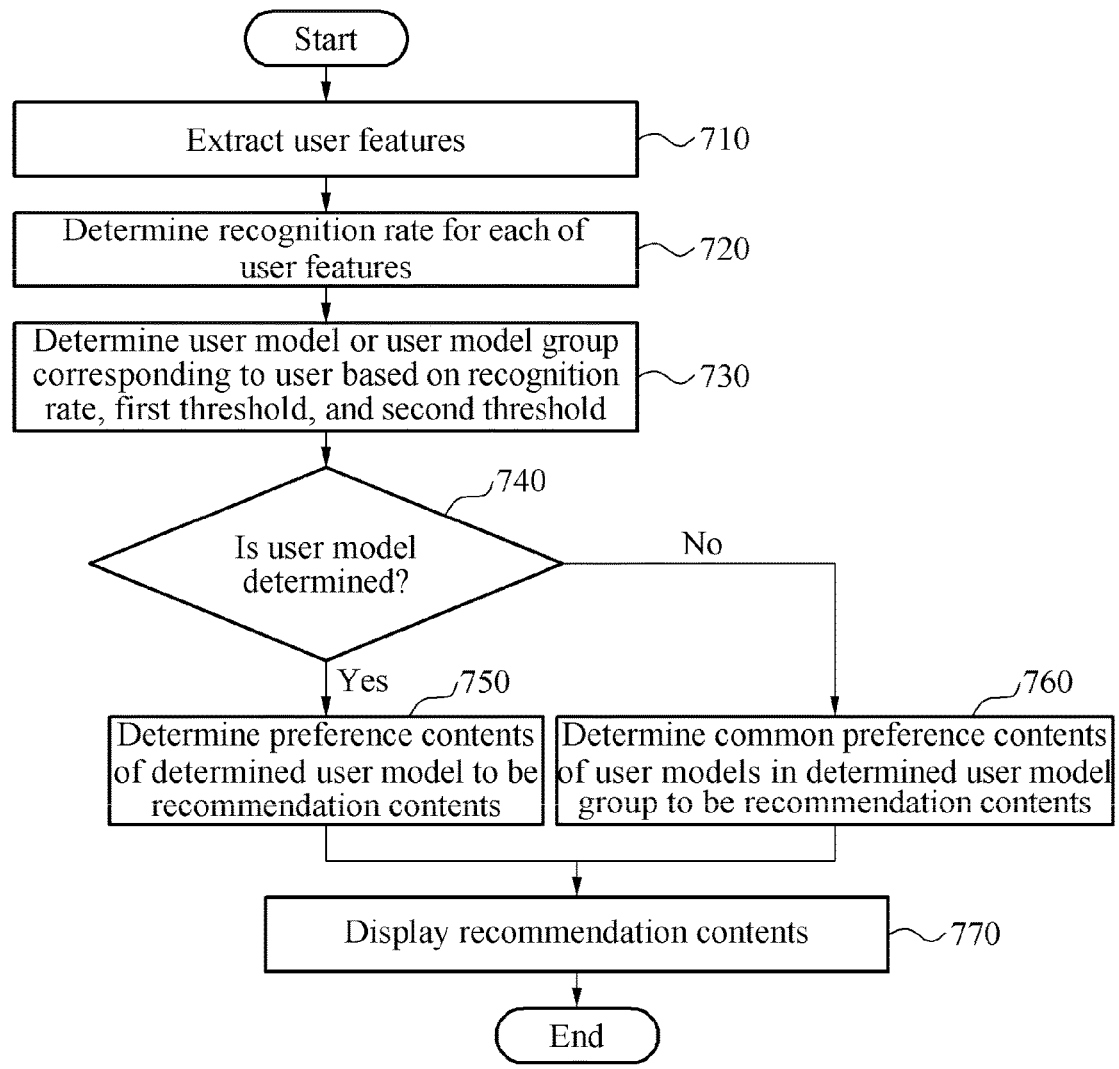
FIG. 7 is a flowchart illustrating an example of a content recommendation method according to an example embodiment.

FIG. 7 is a flowchart illustrating an example of a content recommendation method according to an example embodiment.

In operation 710, a content recommendation device may extract user features of a user from at least one of image data and audio data. The content recommendation device may separate each user from the image data. The content recommendation device may extract user features, for example, a face, a hairstyle, a height, a body type, a gait, a gender, a complexion, and clothing from the image data for each user separated from the image data. The content recommendation device may extract user features, for example, a voice and a sound of footsteps from the audio data.

In operation 720, the content recommendation device may determine a recognition rate for each of the user features. The recognition rate may indicate a degree to which the user is recognized as a user model for each of the user features. For example, in association with the face of the user, when a recognition rate of a user model A is relatively high, a similarity between the face of the user and a face of the user model A may be higher compared to other user models.

In operation 730, the content recommendation device may determine a user model or a user model group corresponding to the user based on the recognition rate determined in operation 720, a first threshold, and a second threshold greater than the first threshold. The first threshold and the second threshold may be the same as each other irrespective of the user features or may differ from each other based on the user features.

For example, as shown in Equation 2, the content recommendation device may determine a final recognition rate for each user model based on the recognition rate and a weight determined for each of the user features and may determine a user model having a highest recognition rate to be the user model corresponding to the user. The content recommendation device may identify a user model having a recognition rate greater than the second threshold for each of the user features, and determine user models having recognition rates, each greater than the first threshold and less than the second threshold for each of the user features to be the user model group. The content recommendation device may determine the user model corresponding to the user based on the user model having the recognition rate greater than the second threshold, the user model group, and the weight determined for each of the user features.

When only one user feature is used, and when a user model having a recognition rate greater than or equal to the second threshold does not exist in association with the user feature, the content recommendation device may determine user models of which recognition rates are included in a range between the first threshold and the second threshold to be the user model group corresponding to the user. When a plurality of user features is used, when the user model having the recognition rate greater than or equal to the second threshold is absent, and when the same user model group is determined for each of the user features, the content recommendation device may determine the user model group to be the user model group corresponding to the user.

In operation 740, the content recommendation device may determine whether the user model corresponding to the user is determined or the user model group corresponding to the user is determined.

When the user model corresponding to the user is determined, in operation 750, the content recommendation device may determine preference contents of the determined user model to be recommendation contents to be provided to the user.

When the user model group corresponding to the user is determined, in operation 760, the content recommendation device may determine common preference contents of user models included in the determined user model group to be the recommendation contents to be provided to the user.

In operation 770, the content recommendation device may display the determined recommendation contents. The content recommendation device may automatically display the recommendation contents or display the recommendation contents when a playback request for the recommendation contents is received from the user. When the content recommendation device displays a plurality of items of contents on a screen, the content recommendation device may display the recommendation contents based on preference information of the user model.

Figure 8:
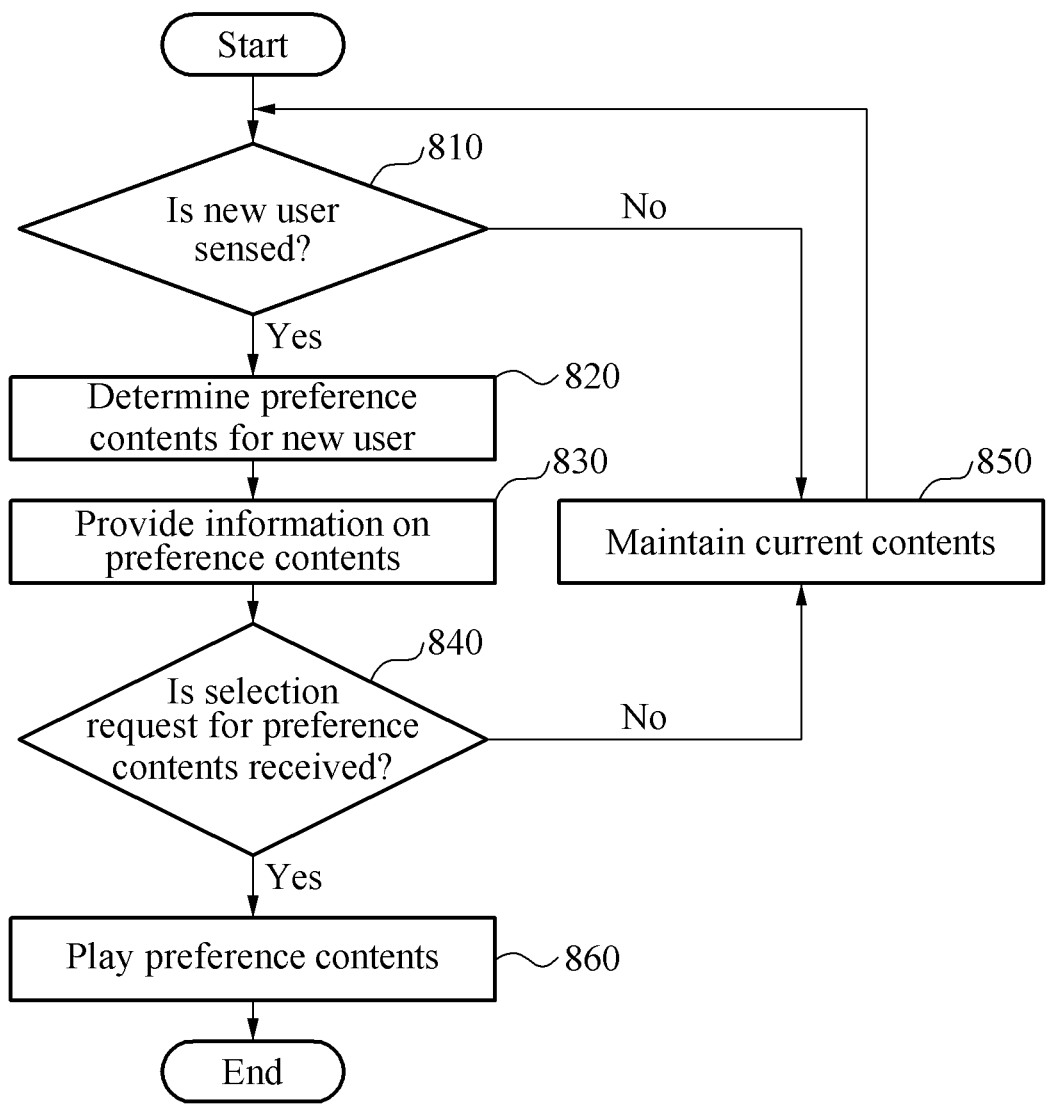
FIG. 8 is a flowchart illustrating another example of a content recommendation method according to an example embodiment.

FIG. 8 is a flowchart illustrating another example of a content recommendation method according to an example embodiment.

Figure 10A:
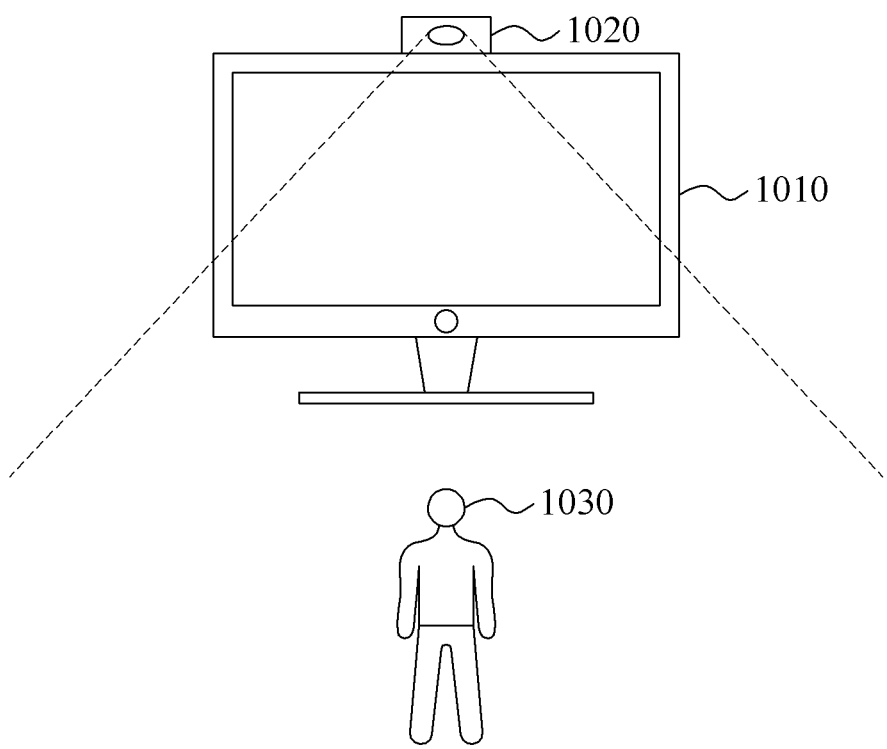
FIGS. 10A and 10B are diagrams illustrating a presence of a new user and an absence of a current user according to an example embodiment.
Figure 10B:
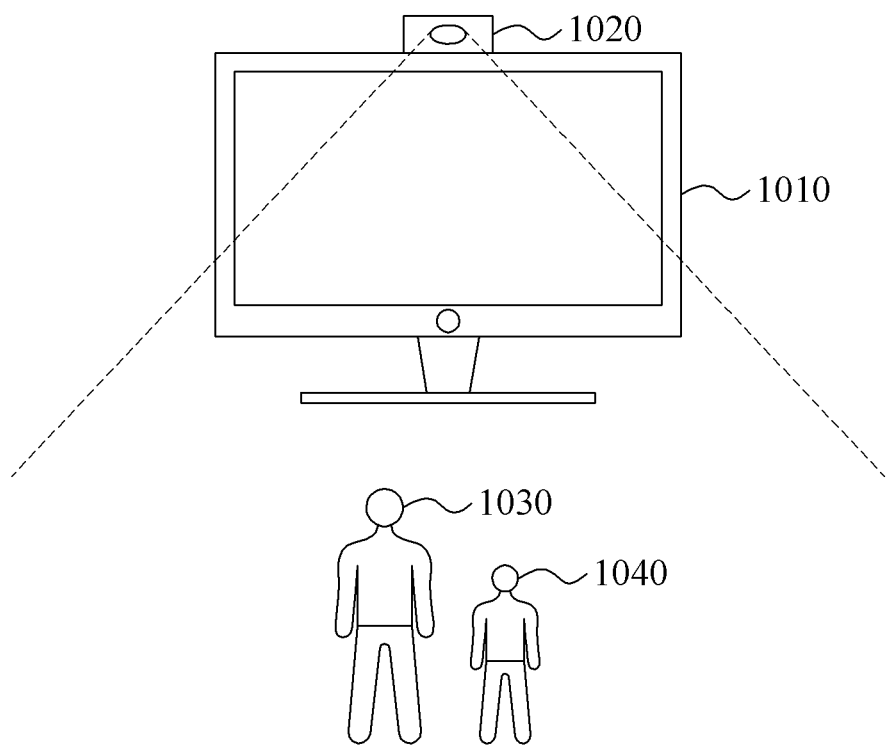

FIG. 8 illustrates a content recommendation method performed when an entry of a user 1040 is newly detected through a camera 1020 as illustrated in FIG. 10B in a state in which a user 1030 is currently viewing contents using a content playback device 1010 as illustrated in FIG. 10A.

Referring back to FIG. 8, in operation 810, a content recommendation device may sense a presence of a new user based on image data acquired by a camera.

In operation 820, when the presence of the new user is sensed, the content recommendation device may determine preference contents for the new user. For example, the content recommendation device may extract user features of the new user from at least one of image data generated by photographing the new user or audio data including a voice, a sound of footsteps, and the like of the new user. The content recommendation device may determine a user model or a user model group corresponding to the new user based on the extracted user features. The descriptions related to a process of determining the user model or the user model group corresponding to the new user in FIG. 1 may also be applicable here. The content recommendation device may determine the preference contents for the new user based on the preference contents of the user model or the common preference contents of the user model group. When the user model corresponding to the new user is determined, the content recommendation device may determine the preference contents of the determined user model to be the preference contents of the new user. When the user model group corresponding to the new user is determined, the content recommendation device may determine the common preference contents of the determined user model group to be the preference contents for the new user.

In operation 830, the content recommendation device may provide information on the preference contents for the new user determined in operation 820. For example, the content recommendation device may display the information using a popup window or in a form of text. Also, the content recommendation device may play the preference contents on a portion of a screen. When the preference contents for the new user is played on the portion of the screen, the content recommendation device may determine a transparency of the preference contents based on a recognition degree of the new user. For example, the content recommendation device may increase a visibility of the preference contents played on the portion of the screen according to an increase in a degree of matching between the new user and the user model. Also, the content recommendation device may increase the transparency of the preference contents according to a decrease in the degree of matching between the new user and the user model.

In operation 840, the content recommendation device may determine whether a selection request for the preference contents is received from the user.

In operation 860, the content recommendation device may suspend playing of current contents and play the preference contents in response to the selection request.

In operation 850, the content recommendation device may maintain the current contents when a presence of the new user is not sensed or when the selection request for the preference contents is not received from the user.

Figure 9:
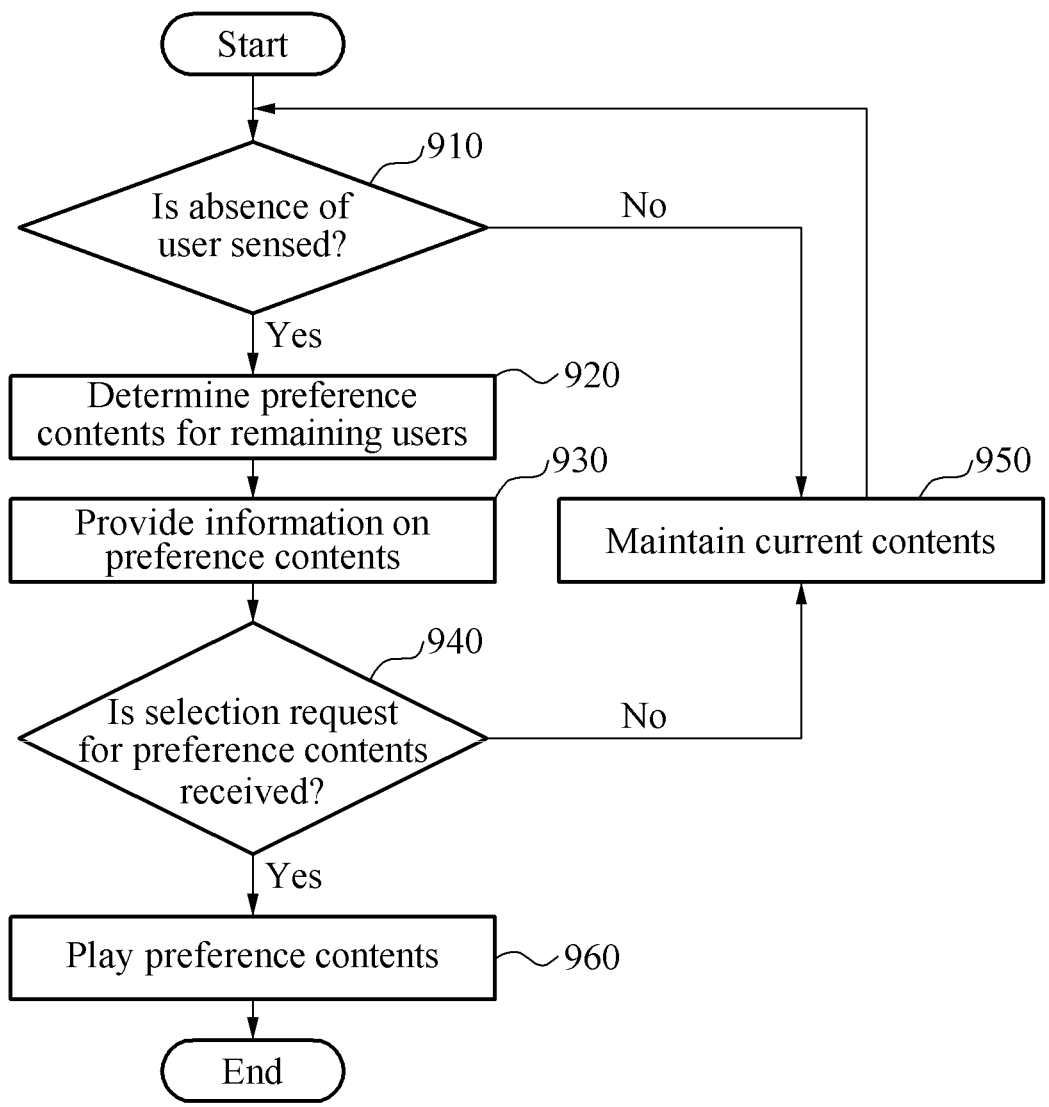
FIG. 9 is a flowchart illustrating still another example of a content recommendation method according to an example embodiment.

FIG. 9 is a flowchart illustrating still another example of a content recommendation method according to an example embodiment.

FIG. 9 illustrates a content recommendation method performed when an absence of the user 1040 is detected through the camera 1020 as illustrated in FIG. 10A while the users 1030 and 1040 are viewing contents using the content playback device 1010 as illustrated in FIG. 10B.

Referring back to FIG. 9, in operation 910, the content recommendation device may sense an absence of a user based on image data acquired through a camera.

In operation 920, when the absence of the user is sensed, the content recommendation device may determine preference contents for remaining users other than the user. The content recommendation device may determine the preference contents for the remaining users based on preference contents of a user model corresponding to the remaining users or common preference contents of a user model group corresponding to the remaining users. The description about a process of determining the user model or the user model group corresponding to the remaining users in FIG. 1 is also applicable here.

In operation 930, the content recommendation device may provide information on the preference contents of the remaining users determined in operation 920. For example, the content recommendation device may display information on the preference contents using a popup window or in a form of text. Also, the content recommendation device may play the preference contents on a portion of a screen. When preference contents of a new user is played on the portion of the screen, the content recommendation device may determine a transparency of the preference contents played on the portion of the screen based on a recognition degree of the remaining users. For example, the content recommendation device may play the preference contents at a visibility increasing according to an increase in a matching degree between the user model and the remaining users. Also, the content recommendation device may increase the transparency of the preference contents played on the portion of the screen according to a decrease in the matching degree between the user model and the remaining users.

In operation 940, the content recommendation device may determine whether a selection request for the preference contents is received from the user.

In operation 960, when the selection request for the preference contents is received, the content recommendation device may suspend playing of current contents and play the preference contents.

In operation 950, when the absence of the user is not sensed, or when the selection request for the preference contents is not received from the user, the content recommendation device may maintain the current contents.

Figure 11:
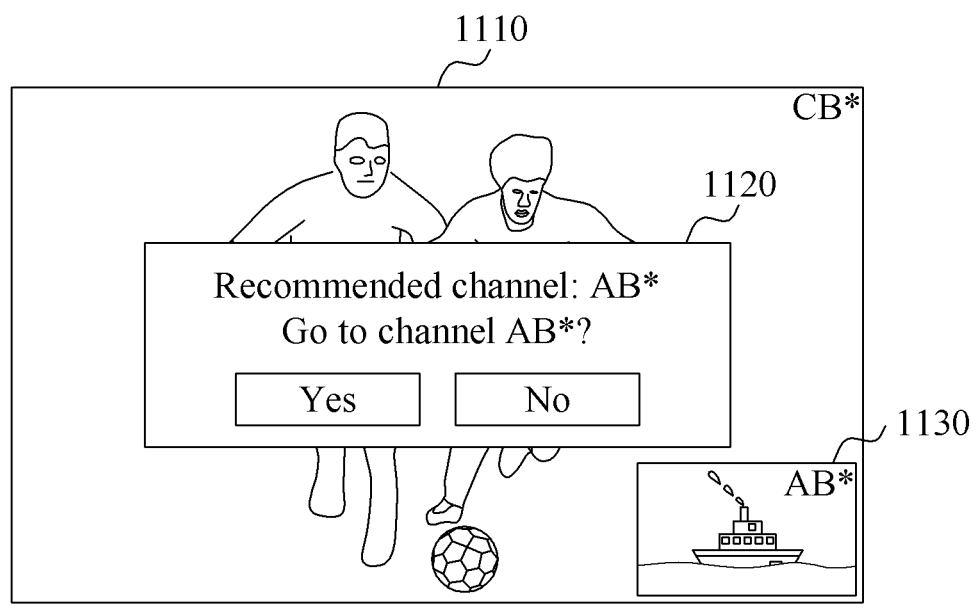
FIG. 11 is a diagram illustrating a procedure of recommending preference contents according to an example embodiment.

FIG. 11 is a diagram illustrating a procedure of recommending preference contents according to an example embodiment.

<A Case in which a Presence of a New User is Detected by a Camera>

For example, a preference contents recommendation procedure in a case in which a presence of a new user is detected while a current user is viewing a channel CB* that broadcasts a soccer game on a screen 1110 will be described.

When the presence of the new user is detected, a content recommendation device may inform the user of a preference channel of the new user using a popup window 1120. The popup window 1120 may include information on the preference channel of the new user. The popup window 1120 may include a message inquiring whether to change a channel to the preference channel of the new user. For example, when the preference channel of the new user is determined as a channel AB*, the content recommendation device may display a text indicating that the channel AB* is a recommendation channel and a text inquiring whether to change a channel to the channel AB* on the popup window 1120.

Also, the content recommendation device may play preference contents of the new user in a form of box on a portion 1130 of the screen 1110 in real time. The user may verify the preference contents played on the portion 1130 of the screen 1110 and determine whether to select a change to the preference contents. The content recommendation device may adjust a transparency of the preference contents played on the portion 1130 based on a recognition degree of the new user. For example, when a similarity between the new user and a user model corresponding to the new user is relatively high, the content recommendation device may display the preference contents at a relatively high visibility. When the similarity is relatively low, the content recommendation device may play the preference contents at a relatively low visibility.

<A Case in which an Absence of a User is Detected>

For example, a preference contents recommendation procedure in a case in which an absence of the current user is detected by the camera while a plurality of users is viewing the channel CB* that broadcasts the soccer game on the screen 1110 will be described.

When the absence of the current user is detected, the content recommendation device may inform remaining users of a preference channel of the remaining users other than the current user using the popup window 1120. The popup window 1120 may include information on the preference channel of the remaining users. The popup window 1120 may include a message inquiring whether to change a channel to the preference channel of the remaining users. For example, when the preference channel of the remaining channel is determined as the channel AB*, the content recommendation device may display a text indicating that the channel AB* is the recommendation channel and a text inquiring whether to change a channel to the channel AB* using the popup window 1120.

Also, the content recommendation device may play preference contents of the remaining users in a form of box on the portion 1130 of the screen 1110 in real time. A user may verify the preference contents played on the portion 1130 of the screen 1110 and determine whether to select to a change to the preference contents. The content recommendation device may adjust a transparency of the preference contents played on the portion 1130 based on a recognition degree of the remaining users. For example, when a similarity between the remaining users and a user model corresponding to the remaining users is relatively high, the content recommendation device may display the preference contents at a relatively high visibility. When the similarity is relatively low, the content recommendation device may play the preference contents at a relatively low visibility.

The methods according to the above-described example embodiments may be performed by at least one processor or recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of recommending contents, the method comprising:
   extracting user features of a user from at least one of image data and audio data;
   determining, for each of the user features, a recognition rate indicating a degree to which the user is recognized as a first user model; and
   determining recommendation contents to be provided to the user based on the recognition rate,
   wherein the determining of the recommendation contents comprises:
   determining, when a plurality of user models have a recognition rate included in a range between a first threshold and a second threshold greater than the first threshold and no user model is determined to have a recognition rate greater than the second threshold, preference contents that are common between the plurality of user models as the recommendation contents.

2. The method of claim 1, further comprising determining a user model corresponding to the user,
   wherein the determining of the user model corresponding to the user includes:
   determining a weight for each of the user features,
   determining a final recognition rate for each user model based on the recognition rates determined for the user features and the weights determined for the user features; and determining a user model having a greatest final recognition rate among the final recognition rates determined for the user models to be the user model corresponding to the user.

3. The method of claim 2, wherein the weight is determined based on at least one of,
a distance from a camera to the user, or
a duration of the determining of the user model.

4. The method of claim 1, further comprising determining a user mode corresponding to the user,
wherein the determining of the user model corresponding to the user includes:
determining a weight for each of the user features;
identifying, with respect to each of the user features, a user model having a recognition rate greater than or equal to the second threshold; determining, for each of the user features, a corresponding user model group such that,
for each user feature, the user model group corresponding to the user feature includes models, from among the user models, that have a recognition rate greater than the first threshold and less than the second threshold; and
determining the user model corresponding to the user based on,
the user models identified with respect to the user features,
the user model groups determined for the user features, and
the weights determined for the user features.

5. The method of claim 1, further comprising:
displaying the recommendation contents.

6. The method of claim 1, wherein the determining of the recommendation contents includes:
determining, for each of the user features, one or more user models having a recognition rate included in the range between the first threshold and the second threshold;
determining preference contents that are common between the one or more user models determined for each of the user features, when no user model is determined to have a recognition rate greater than the second threshold;
outputting a selection request message requesting selection of one of the preference contents that are common between the one or more user modules determined for each of the user features; and
determining a user model corresponding to the user based on a selection response message responding to the selection request message and determining preference contents of the determined user model as the recommendation contents to be provided to the user.

7. The method of claim 1, wherein the user features include at least one of a face, a hairstyle, a height, a body type, a gait, a gender, a complexion, a voice, a sound of footsteps, or clothing of the user.

8. A non-transitory computer-readable medium comprising a program for instructing a computer to perform the method of claim 1.

9. A method of recommending contents, the method comprising:
detecting a presence of a new user based on image data acquired by a camera;
determining preference contents for the new user when the new user is present; and
providing information on the determined preference contents,
wherein the determining of the preference contents comprises:
extracting a user feature of the new user;
determining a user model corresponding to the new user based on the extracted user feature; and
determining, when a plurality of user models corresponding to users including the new user have a recognition rate included in a range between a first threshold and a second threshold greater than the first threshold and no user model is determined to have a recognition rate greater than the second threshold, common preference contents of the plurality of user models as the preference contents for the new user.

10. The method of claim 9, wherein the providing of the information on the preference contents includes displaying the information using a popup window or playing the preference contents on a portion of a screen.

11. The method of claim 9, wherein when the preference contents are played on a portion of a screen, the providing of the information on the preference contents includes determining a transparency of the preference contents based on a recognition degree of the new user.

12. The method of claim 9, further comprising:
suspending playing of current contents and playing the preference contents when a selection request for the preference contents is received.

13. A method of recommending contents, the method comprising:
detecting an absence of one of a plurality of current users based on image data acquired by a camera;
determining preference contents for remaining users of the plurality of current users, excluding the current user whose absence was detected, when the absence is detected; and
providing information on the determined preference contents,
wherein the determining of the preference contents comprises:
determining, when a plurality of user models corresponding to the remaining users have a recognition rate included in a range between a first threshold and a second threshold greater than the first threshold and no user model is determined to have a recognition rate greater than the second threshold, common preference contents of the plurality of user models as the preference contents.

14. The method of claim 13, wherein the providing of the information on the preference contents comprises:
displaying the information on the preference contents using a popup window or playing the preference contents on a portion of a screen.

15. The method of claim 13, wherein the providing of the information on the preference contents includes determining a transparency of the preference contents based on a recognition degree of the remaining users, when the preference contents are played on a portion of a screen.

16. The method of claim 13, further comprising:
suspending playing of current contents and playing the preference contents when a selection request for the preference contents is received.

* * * * *